(12) United States Patent
Mayo

(10) Patent No.: US 10,503,882 B2
(45) Date of Patent: Dec. 10, 2019

(54) FILE EXECUTION

(71) Applicant: 1E Limited, London (GB)

(72) Inventor: Andrew Mayo, London (GB)

(73) Assignee: 1E Limited, London (GB)

( * ) Notice: Subject to any disclaimer, the term of this patent is extended or adjusted under 35 U.S.C. 154(b) by 179 days.

(21) Appl. No.: 15/706,499

(22) Filed: Sep. 15, 2017

(65) Prior Publication Data

US 2018/0082047 A1 Mar. 22, 2018

(30) Foreign Application Priority Data

Sep. 16, 2016 (GB) .................................. 1615828.9

(51) Int. Cl.
| | |
|---|---|
| *H04L 29/00* | (2006.01) |
| *G06F 21/12* | (2013.01) |
| *H04L 9/06* | (2006.01) |
| *H04L 9/30* | (2006.01) |

(52) U.S. Cl.
CPC .......... *G06F 21/121* (2013.01); *H04L 9/0643* (2013.01); *H04L 9/30* (2013.01)

(58) Field of Classification Search
CPC ... H04L 9/3247; H04L 9/3236; H04L 9/0643; H04L 9/30
See application file for complete search history.

(56) References Cited

U.S. PATENT DOCUMENTS

| | | | |
|---|---|---|---|
| 6,694,434 B1 * | 2/2004 | McGee | .................. G06F 21/565 713/182 |
| 8,181,035 B1 | 5/2012 | Fernandez Gutierrez | |
| 8,200,983 B1 | 6/2012 | Victorov | |
| 9,501,644 B2 * | 11/2016 | Niemela | ............... G06F 21/566 |
| 2003/0046128 A1 | 3/2003 | Heinrich | |
| 2006/0184792 A1 * | 8/2006 | Berlin | ..................... G06F 21/51 713/165 |

(Continued)

FOREIGN PATENT DOCUMENTS

| | | |
|---|---|---|
| CN | 102332070 A | 1/2012 |
| JP | 2013109553 A | 6/2013 |

OTHER PUBLICATIONS

Hua et al., "Semantic-Aware Metadata Organization Paradigm in Next-Generation File systems", IEEE Transactions on Parallel and Distributed Systems, vol. 23, Issue: 2, Feb. (Year: 2012).*

(Continued)

*Primary Examiner* — Morshed Mehedi
(74) *Attorney, Agent, or Firm* — EIP US LLP

(57) ABSTRACT

Methods and systems are described herein to restrict execution of files stored on a computing device. In an example a request to execute a file is intercepted by a security agent on the computing device. The security agent is arranged to determine if metadata stored with the with the file comprises a cryptographic code comprising a function of at least a private key of a security server in communication with the computing device and a first hash value the first hash value being an output of a hash function applied to data associated with the file at a first time. If the security agent determines that the metadata comprises the cryptographic code, it verifies the code with a public key of the security server, obtains a second hash value of the file at a second time and executes the file if the first hash value matches the second hash value.

20 Claims, 10 Drawing Sheets

(56) References Cited

U.S. PATENT DOCUMENTS

| | | | |
|---|---|---|---|
| 2008/0134297 A1* | 6/2008 | Clinick | G06F 21/51 |
| | | | 726/4 |
| 2009/0106549 A1* | 4/2009 | Mohamed | G06F 21/6218 |
| | | | 713/156 |
| 2011/0047597 A1 | 2/2011 | Mahaffey et al. | |
| 2012/0047365 A1* | 2/2012 | Mercer | G06F 21/606 |
| | | | 713/168 |
| 2012/0204024 A1* | 8/2012 | Augenstein | G06F 11/1453 |
| | | | 713/150 |
| 2013/0333039 A1 | 12/2013 | Kelly | |
| 2014/0068274 A1* | 3/2014 | Kasatkin | G06F 21/64 |
| | | | 713/189 |
| 2014/0181119 A1* | 6/2014 | Chiueh | G06F 16/137 |
| | | | 707/747 |
| 2014/0201843 A1 | 7/2014 | Hibbert et al. | |

OTHER PUBLICATIONS

"AppSense User Rights Management: Overview: Practical and cost effective balance between IT compliance and user demand"; http://www.appsense.com/; captured Jun. 2016.

United Kingdom Search Report dated Mar. 9, 2017 on related application No. GB1615828.9 filed Sep. 16, 2016.

* cited by examiner

FILE EXECUTION

CROSS-REFERENCE TO RELATED APPLICATIONS

This application claims priority to GB Application No. GB1615828.9, filed Sep. 16, 2016. Each of the above-referenced patent applications is incorporated by reference in its entirety.

BACKGROUND OF THE INVENTION

Field of the Invention

The present invention relates to restriction of execution of files on a computing device in a network based on a cryptographic code stored in metadata of the file.

Description of the Related Technology

Most modern organizations operate in networked computing environments. Typically these networked computing environments comprise a plurality of different types of computing devices including servers, desktop computers, virtual computing resources and mobile devices such as laptops and cell phones. It is becoming increasingly commonplace for users to access an organization's network through more than one type of device. A user may wish to access an organization's network at their desk but also access the network outside, on the move where connectivity to the network is intermittent. This presents a number of problems for organizations. Devices which are intermittently connected to networks present a risk to an organization from the point of view of securing data in the network. A device may connect to multiple networks outside of an organization's network. The security of data on a device, whilst disconnected from an organization's network, cannot be guaranteed when that device attempts to reconnect to the original network. For example, malicious software may be loaded onto a device whilst the device is outside the control of the organization's network.

Security practitioners have attempted to address this threat with various techniques. One such technique uses whitelisting of "safe" programs on devices. For example, organizations may store lists of trusted software on databases in their network. Trusted software may include programs created by the organization themselves, or alternatively programs where the code has been signed by a trusted entity. Programs on computing devices which are connected to an organization's network are checked against the whitelist before they are allowed to run on the device.

Others examples of techniques used to reduce the risk include the use of secure modules on devices. One well known example of a secure module is the Trusted Platform Module (TPM). A TPM is a cryptographic coprocessor which meets the international standard for trusted computing as specified by the Trusted Computing Group. A TPM can securely compute and store so-called "Integrity values". An integrity value is typically a value resulting from the computation of a hash function on, for example, the binary of an executable file. The integrity value is "trusted" in the sense that it is stored securely in the TPM and cannot be modified. At a later point in time the integrity value can be recomputed for the executable file and checked against the stored value. TPMs can therefore be used to prevent tampering with software which has been installed on a device and also prevent new software from executing on a device.

Known techniques offer varying levels of protection depending on the availability of hardware on the device. Cryptographically secure hardware such as trusted platform modules may not always be available on devices in dynamic networked environments. On the other hand, providing a system which allows programs to be run based on an ad-hoc "risk assessment" and whitelisting does not provide the same high levels of confidence for the organization.

Consequently there is a need for a system which provides an efficient means of whitelisting with cryptographic security but without the requirement of specialist hardware such as TPMs.

SUMMARY

Aspects of the present invention are set out in the appended claims.

Various features and advantages of the present disclosure will be apparent from the detailed description which follows, taken in conjunction with the accompanying drawings, which together illustrate, by way of example only, features of the present disclosure:

DETAILED DESCRIPTION OF CERTAIN INVENTIVE EMBODIMENTS

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Figure 1:
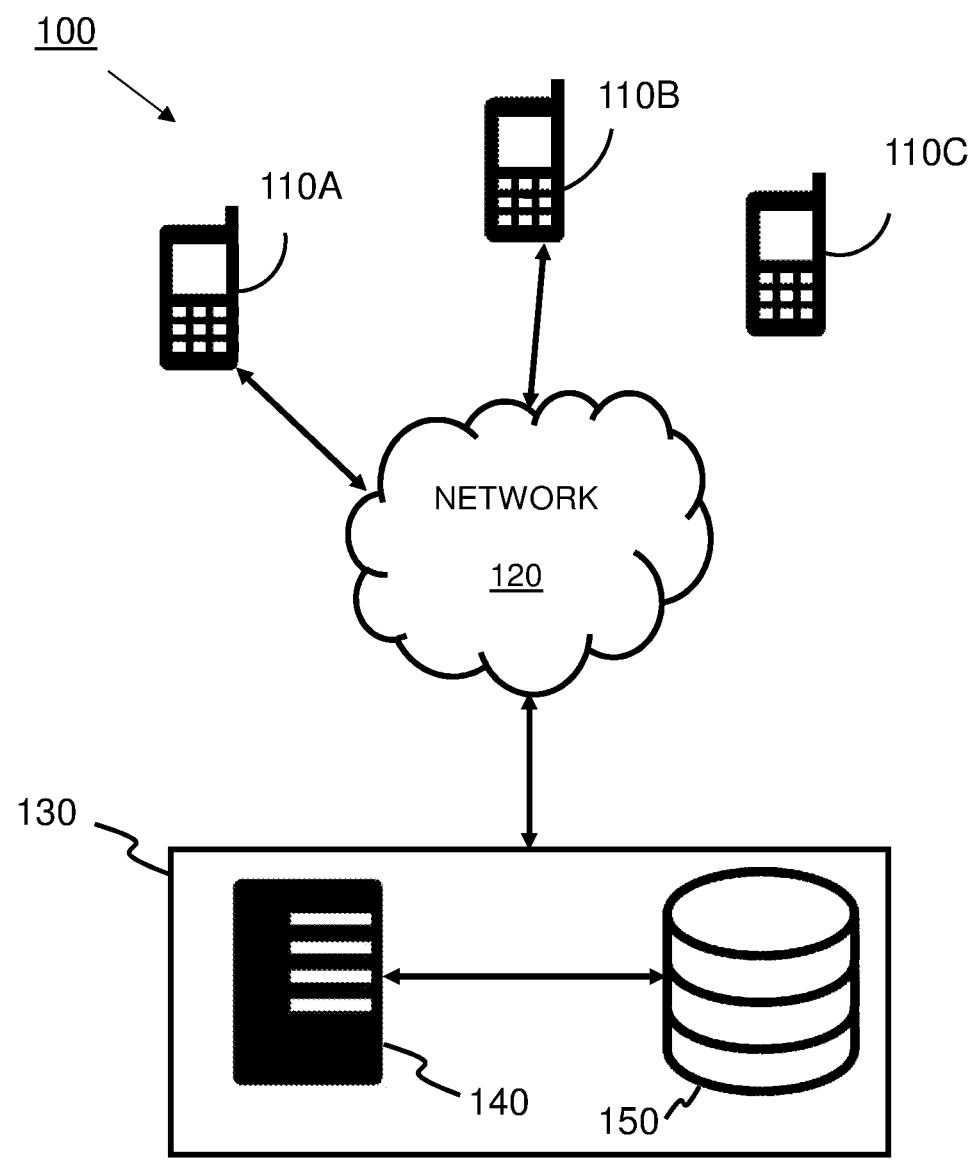
FIG. 1 is a schematic diagram showing a networked computing environment according to an example.

FIG. 1 is a simplified schematic diagram showing a networking environment 100 comprising various network infrastructure components according to an example. In FIG. 1, a plurality of computing devices 110A-110C are shown. The computing devices 110A and 110B are communicatively coupled to a network 120. The computing device 110C is not communicatively coupled to the network 120. A device which is "communicatively coupled" to the network 120 is a device which is connected to the network 120 over a communication channel. The communication channel can be a wired or wireless connection between the device and the network 120. The network could be a WiFi network, LAN, WAN etc. In the example shown in FIG. 1, the network 120 may be a private or public network. For example, the network 120 may be a private enterprise network accessible to only those computing devices 110A-110C which are authorized to access it. Alternatively, the network 120 may be a public network such as the internet and/or a mobile network.

In FIG. 1 a network entity 130 is shown in communication with the network 120. The network entity 130 comprises a security server 140 and a storage entity 150. The network entity 130 may comprise additional servers, or storage components, and/or further networking components in addition to those shown in FIG. 1. For example, the network entity 130 may comprise a collection of physically networked components, one or more cloud resources and/or virtual network components. For example, the network entity 130 may comprise a plurality of physical servers hosting cloud resources which are accessible to the computing devices 110A, 110B connected to the network entity 130 over the network 120.

In FIG. 1, the computing devices labelled 110A and 110B have access to the network entity 130. In the present context, being granted access to the network entity 130 may require authorization by the security server 140. As will be described herein, the role of the security server 140 is to provide cryptographic code for executable files on the computing devices connected to the network entity 130. The security server 140 is arranged to prevent applications from executing files on the connected computing devices 110A, 110B which are e.g. malicious and could potentially harm one or more of the computing device and other networked components in the network entity 130. For example, if the network 120 is an enterprise network, and the connected computing devices 110A, 110B are external to that network, the security server 140 is arranged to prevent unknown software being executed by any devices 110A, 110B which are trusted by the network 120. Note that any computing device which is not trusted by such a network 120 will not be granted access to the network 120 in the first place, and malicious software would not be able to gain access to the network 120 via such a device 110A, 110B. Hence, the role of the security server 140 is to prevent execution of unknown software and/or untrusted software on trusted devices 110A, 110B.

In some cases, computing devices 110A-110C which are intermittently connected to the network 120, may have software and/or executable files loaded on them when they are not in secure communication with the network entity 130 or connected to the network 120. The role of the security server 140 is to prevent executable files which have been brought into the network 120 by a trusted device 110A-110C being executed on a computing device 110A-110C in the situation where those files may not be trusted.

The computing devices 110A-110C shown in FIG. 1, may be devices such as laptops, smartphones, PDAs, or tablets etc. These devices are typically intermittently connected to the network 120. For example, and as shown in FIG. 1, the computing devices 110A and 110B are connected to the network 120 initially, and device 110C is not connected to the network 120. At a later point in time, the device 110C may be connected to the network 120 and one or more of the initially connected devices 110A, 110B may become disconnected from the network 120.

The networking environment 100 shown in FIG. 1 is illustrative of a dynamic networking environment in which one or more computing devices 110A-110C may become connected or disconnected from the network. The computing devices 110A-110C may be in frequent use and consequently files which are stored on those devices may frequently receive updates. Moreover, although the example networking environment 100 shown in FIG. 1 comprises three computing devices 110A to 110C, a typical networking environment comprises many hundreds, or thousands, of computing devices for which the exact specifications of each device may be unknown to the network entity 130. In particular the hardware arrangements of the computing devices typically vary from device to device. For example, the amount of storage capacity on any particular device is typically unknown to the security server 140. Consequently any security mechanism in place for protecting the network entity 130 from malicious files on computing devices 110A-110C in the network environment 100 must place minimal requirements on the computing devices 110A-110C. A system which, for example, requires that the computing devices 110A to 110C store large amounts of data cannot be considered practical in a dynamic network environment with a large and variable numbers of endpoints.

Figure 2:
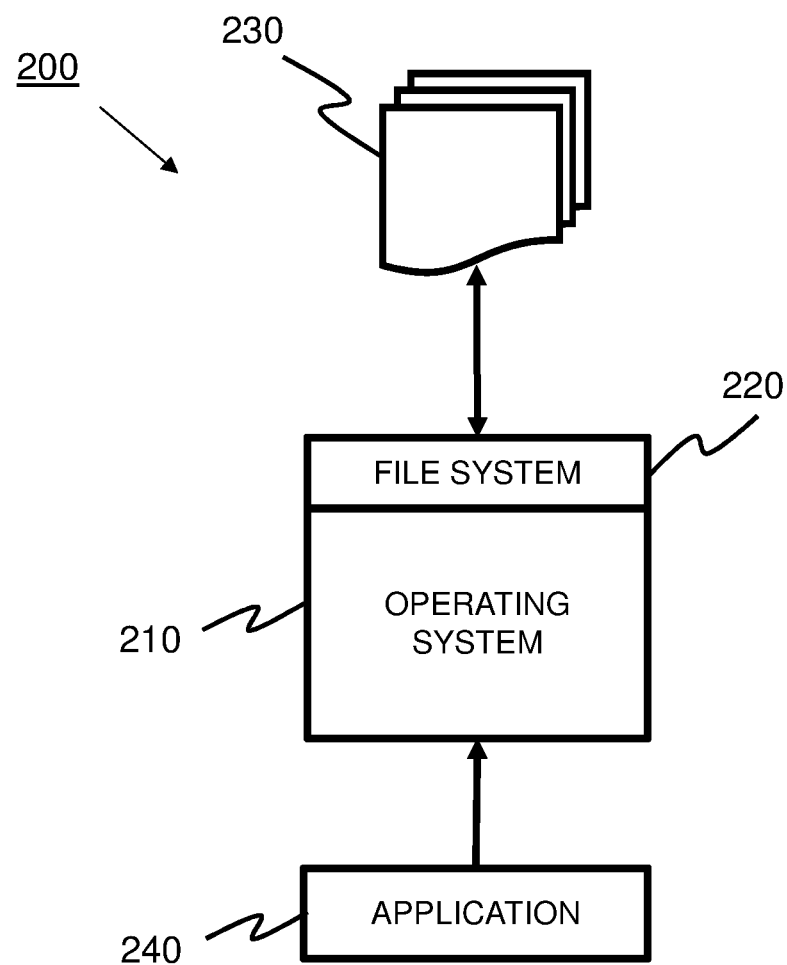
FIG. 2 is a schematic diagram showing an arrangement of software according to an example.

FIG. 2 is a simplified schematic diagram of an arrangement of software 200 suitable for use with the computing devices 110A-110C shown in FIG. 1. The software arrangement 200 in FIG. 2 comprises an operating system (OS) 210, and in the example shown in FIG. 2, the OS 210 has access to a file system 220. The file system 220 comprises one or more data structures on the computing device for managing file storage and file access. The file system 220 is operable via the OS 210. In particular, the file system 220 allows the OS 210 to organize where files are stored within a memory of a computing device 110A-110C. The file system 220 can also allow the OS 210 to access files which are stored remotely from the computer device 110A-110C. For example, files can be accessed through the file system 220 which are stored in a cloud storage system. The file system 220 also specifies how files are accessed by individual users and applications on the computing device 110A-110C. The files which are accessible to the computing device 110A-110C may be arranged in directories and sub-directories by the file system 220. For example, where the arrangement of software 200 is loaded on the computing device 110A as shown in FIG. 1, the OS 210, and applications running on the OS 210, access files via the file system 220, said file system 220 managing data storage on the computing device 110A and/or data storage on one or more network storage devices accessible via the network 120. The file system 220 may provide access to the storage entity 150 shown in FIG. 1 from the computing device 110A.

FIG. 2 shows a plurality of files 230 as being accessible to the file system 220. A request to access a single file amongst the plurality of files 230 is processed by the file system 220 in response to a request received via the OS 210. In FIG. 2, an application 240 is shown accessing the OS 210. The OS 210 is arranged to respond to instructions received from the application 240 to perform functions, for example, retrieval and execution of files accessible via the file system 220. In certain cases, the application 240 may comprise part of the OS 210, such as a file explorer or a command line interface. In one example, a request is made by the application 240 to the OS 210 to execute an executable file stored in the plurality of files 230. In response to the request to execute the file, the file system 220 is arranged to retrieve the executable file from the plurality of files 230 for the OS 210. For example, when implemented on a device such as the computing device 110A shown in FIG. 1, retrieval of the executable file comprises retrieving the file from storage on the computing device 110A or retrieving the file over the network 120. Once the executable file has been retrieved, it is moved into the main memory of the computing device 110A from which the OS 210 can launch the executable file. In the arrangement of software 200 shown in FIG. 2, requests to execute files are processed independently of any security mechanism to protect the computing 110A-110C device implementing the software 200. In particular there is no mechanism to prevent an application such as application 240 sending a request to execute a malicious executable file from the file system 230.

Figure 3:
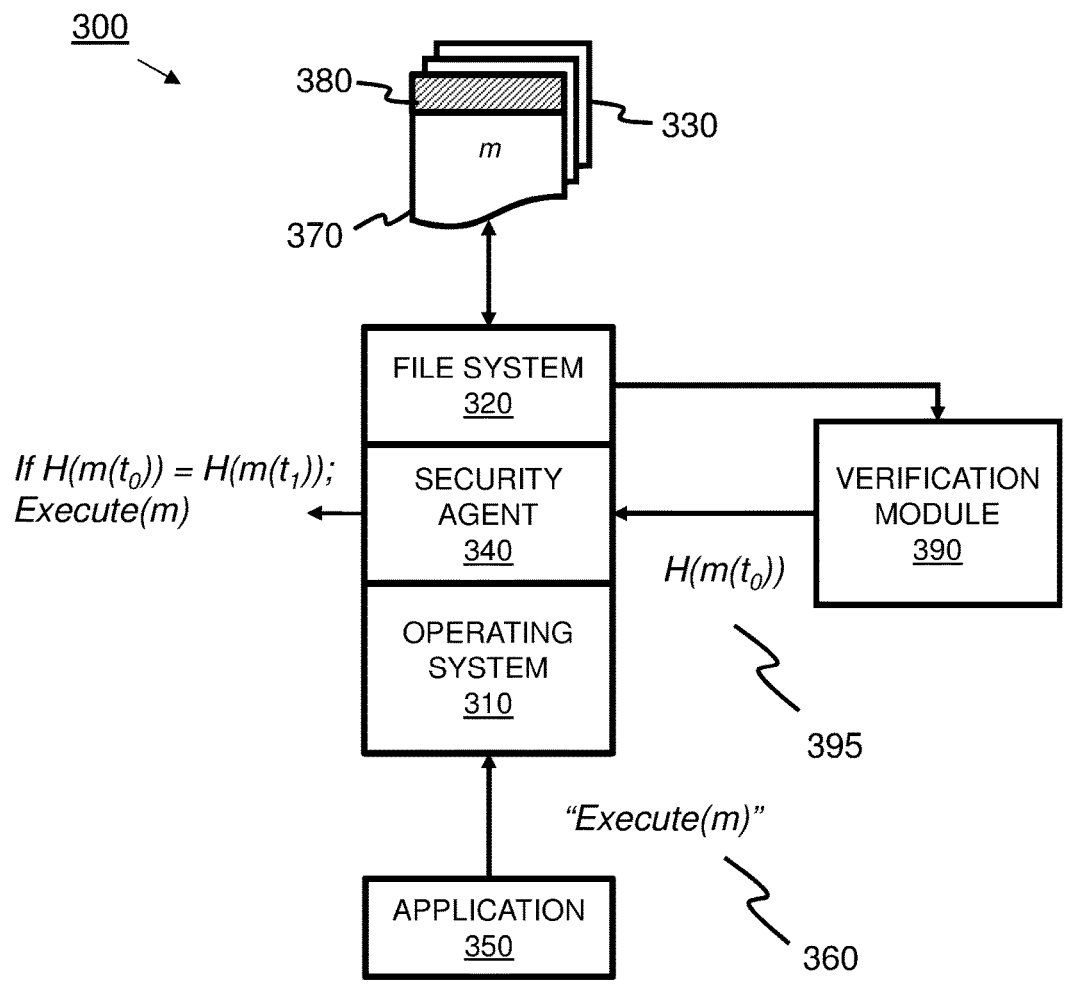
FIG. 3 is a schematic diagram showing an arrangement of software according to an example.

FIG. 3 is a simplified schematic diagram of an arrangement of software 300 that may be implemented on the computing devices 110A-110C shown in FIG. 1. The arrangement of software 300 shown in FIG. 3 is similar to the arrangement of software 200 shown in FIG. 2: the arrangement 300 in FIG. 3 comprises an OS 310 and a file system 320. The OS 310 may be implemented from the main memory of a computing device 110A-110 C implementing the arrangement 300 as shown in FIG. 3. The file system 320 provides access to files 330 stored locally or remotely over a network 120 when the computing device 110A-110C implementing the arrangement 300 is connected to the network 120. As in the example of the arrangement 200 shown in FIG. 2, the OS 310 is arranged to receive and process requests to access files in the file system 320. The requests may be made by applications 350 installed on the computing device 110A-110C or by users of the OS 310. A security agent 340 is also installed on the OS 310. The security agent 340 is a software application which is arranged to intercept requests made to (or, in certain implementations, by) the OS 310 to access and execute files on the file system 320.

In relation to the networking environment shown in FIG. 1, a computing device 110A is authorized to communicate with the security server 140 in the network entity 130. The computing device 110A implements the security agent 340 as a service or function at the operating system level, i.e. the security agent 340 operates transparently to application 350. The security agent 340 interacts with functions of OS 310, e.g. intercepts requests to execute files, which are accessible through the file system 320, wherein the requests are made by e.g. applications running on the OS 310 and/or are requests made to access files by e.g. users of the computing device 110A. For example, the security agent 340 may access a low level input/output (I/O) hook, wherein the agent registers with the OS 310 to be passed on I/O requests to the file system 320. In a Windows system these may comprise "filter" drivers. As such the security agent 340 schematically sits between the OS 310 and the file system 320 as shown in FIG. 3.

In FIG. 3 an application 350 is shown making a request 360 to execute an executable file 370: "Execute(m)" to the OS 310. A request to execute a file may come from the OS 310 itself, or an external piece of software via the network 120 or, alternatively, via a user of the computing device 110A-110C. The security agent 340 intercepts the request 360. The interception of the request 360 by the security agent 340 may occur before the file 370 has been retrieved from the file system 320 or after. In one case, the security agent 340 may register with an OS or file system function that passes all requests to the agent prior to action by the file system 320. In either case, the interception happens before the file is executed by the computing device. If the file is not retrieved from the file system 320, for example if the file 350 is stored remotely and the computing device is not connected to the remote storage, then the file system 320 may inform the OS 310 that there has been a failure to retrieve the file.

The security agent 340 is arranged to read and examine metadata 380 associated to the executable file 370, prior to its execution. The metadata 380 is data stored with the executable file 370. In particular, the metadata 380 is not stored separately in the memory and/or storage of a computing device 110A-110C separately from the executable file 370. For example, if the executable file 370 is loaded from the file system 320 into the main memory of a computing device 110A-110C and is then transferred to a second computing device 110A-110C over the network 120, then the metadata 380 is also transferred to the second computing device 110A-110C with the file 370.

When the security agent 340 examines the metadata 380 it is arranged to determine if there is a cryptographic code stored in the metadata 380. According to examples described herein, the files which may be executed on the computing device 110A comprise those files which contain metadata 380 comprising a particular kind of cryptographic code. If the security agent 340 examines the metadata 380 associated with the file m 370 and it is found that there is no data stored in the metadata 380, and hence no cryptographic code, then the file m 370 will not be allowed to execute and the request 360 is ignored by the OS 310. For example, the security agent 340 may return a negative response to a function call from one or the OS 310 or file system 320. Alternatively, the security agent 340 may omit to call a function of the file system 320 that is normally used to retrieve the file, such that an error is returned. Similarly if the metadata 380 is corrupted, or if the metadata 380 is partially missing then the security agent 340 can inform the OS 310 to ignore the request 360 to execute the file m 370.

As noted, the security agent 340 is arranged to determine if the metadata 380 comprises a cryptographic code. The particular cryptographic code which allows the executable file 370 to be executed on the computing device 110A comprises a cryptographic function of at least a private key of the security server 140 in communication with the computing device and a first hash value. As will be described in relation to the security server 140 shown in FIG. 1, the cryptographic code in the metadata 380 of the executable file 370 was determined at a first time in response to a request from the computing device to the security server for the cryptographic code.

Responsive to a determination that the metadata 380 stored with the executable file 370 does comprise a cryptographic code, the security agent is arranged to verify the cryptographic code stored in the metadata using a public key available to the security agent.

In FIG. 3, a verification module 390 takes a key and a ciphertext as input, and outputs the result of applying a verification algorithm with the inputted key and ciphertext. The output is either a plaintext message comprising a hash value, or a void message. A void message is output if the output ciphertext was not the result of the application of a signature algorithm with the private key to a plaintext message. In other words, only those ciphertexts resulting from a valid application of a signature algorithm verify to valid plaintext messages. In FIG. 3, the cryptographic code stored in the metadata 380 is verified, and a hash value 395 of $H(m(t_0))$ is outputted. The hash value 395 is generated by applying a hash function H to the data associated with the file m 370 at a first time $t_0$. If the verification of the data stored as metadata 380 against the executable file m 370 had resulted in anything other than a hash value, then the executable file 370 would not have been executed by the OS 310. The security agent 340 is arranged to obtain a second hash value comprising an output of the hash function H applied to the data associated with the file m 370 at a second time $t_1$. In FIG. 3 the security agent 340 computes the hash value itself, however in another example it is possible to obtain the hash value from a dedicated hashing module.

In FIG. 3, the security agent 340 determines if the output of the hash function H at the first time $t_0$, which was obtained from the cryptographic code stored against the executable file m 370 in the metadata 380, matches the output of the hash function at the second time $t_1$. In response to a positive determination, the OS 310 is arranged to execute the executable file m 370. In one example, if the value of the application of the hash function to the data associated to the executable file m 370 does not match the value obtained from the cryptographic code, the OS 310 is arranged to prevent the execution of the file m 370. This could happen if, for example, the metadata attached to the executable file m 370 has been swapped with metadata from a second file, or if the data associated with the original executable file m 370 had been modified between the first time $t_0$ and the second time $t_1$.

According to an example, the security agent 340 is arranged to compute the hash value at a first time $t_0$. In one case, the security agent computes the value of the hash function H itself at the first time $t_0$. Alternatively, the security agent 340 is arranged to send instructions to a central processing unit (CPU) of the computing device 110A-110C to compute the hash value. As described previously, the security agent 340 may use a dedicated hashing module. For example, many modern processors come equipped with cryptographic co-processors which can be used to efficiently compute hash function values and other values in cryptographic algorithms. Once the security agent 340 has obtained the hash value, the security agent 340 is arranged to request the cryptographic code from the security server 140. In particular, the security agent 340 can send a message, via a network interface of the computing device 110A-110C, comprising the first hash value computed at time to of the executable file 370. The security server 140 is arranged to compute the cryptographic code as a function of the private key and the first hash value, and return the cryptographic code to the computing device 110A-110C. Following receipt of the cryptographic code from the security server 140, the security agent 340 is arranged to store the code in the metadata 380 within the executable file 370.

According to an example, if a request "Execute(m)" is intercepted by the security agent 340, the security agent 340 inspects the metadata 380 stored within the executable file 370 called "m". If the metadata 380 does not comprise the cryptographic code, the security agent 340 will attempt to send a request to the security server 140; the request being for a cryptographic code of the kind previously described for the executable file 370. If the cryptographic code is generated, the code will be stored against the file in the associated metadata 380. However, if there is no response to the request then the OS 310 prevents execution of the file "m" 370 on the basis that the computing device 110A-110C has not been in communication with the security server 140, or alternatively, the security server 140 denied the request. A security server 140 may deny a request if, for example, the computing device 110A-110C which requested the cryptographic code is not authorized to do so. A computing device 110A-110C can be authorized through one or more authorization protocols implemented by the network 120 and/or security server 140. Alternatively, the security server 140 may deny the cryptographic code to the computing device 110A-110C on the basis that the request was made for by the computing device 110A-110C following a request to execute a blacklisted file.

The OS 310 may prevent execution of a file on the computing device 110A-110C because the file has no metadata associated with it. Similarly, the OS 310 can prevent execution of a file because the computing device 110A-110C is not connected to the network 120. In that case a request for the cryptographic code from the security server 140 cannot be fulfilled. These measures prevent files being executed on the computing device 110A-110C which may have been installed maliciously when the computing device 110A-110C was outside of the network environment 100 shown in FIG. 1.

According to one example, the steps of making a request for the cryptographic code and storing the cryptographic code against the executable file 370 in the metadata 380 are performed prior to a request 360 to access the executable file 370 has been intercepted. For example, in one case, the security agent 340 performs these operation steps following location of the file in a scan of the file system 320. The file system 320 may be routinely scanned for new files 330, or alternatively, may be scanned in response to the computing device 110A-110C connecting to the network 120 for the first time. For example, in the example network environment 100 shown in FIG. 1, the security server 140 may request that the file system 120 be scanned in response to the computing device 110A connecting to the network 120 and/or authorized by the security server 140.

In an alternative example to the embodiments described previously, rather than computing the hash function H on input of the data m associated with the executable file 370, the security agent 340 computes the hash function of an input comprising a code signing certificate which has been used to digitally sign the executable file 370. Code signing is the process of digitally signing the code stored in executable files to confirm the software author and guarantee that the code has not been altered or corrupted since it was signed. A certificate provides a cryptographically verifiable proof of this fact. Computing the hash value of a code signing certificate allows an efficient mechanism for managing offline processing of signed data since the hash value need not be computed each time the executable file is run.

In one case, the cryptographic code associated to the file 370 comprises a cryptographic function of a private key of the security server 140, the first hash value, computed as an output of the hash function of the data associated to the executable file m 370—either the code signing certificate or the data of the file itself, and a hardware identifier of the computing device 110A-110C. A hardware identifier could be a hash value of a serial number of hardware in the computing device 110A-110C, for example. The inclusion of the hardware identifier in the cryptographic code ties the cryptographic code stored in the metadata 380 to the computing device 110A-110C as well as the security server 140 and the data associated to the file m 370. For example, with reference to FIG. 1, when a hardware identifier is included in the cryptographic code, a file cannot be executed on the device 110B without generating new metadata. If the file was originally stored on the device 110A and metadata was generated in a device-dependent fashion then the original metadata for the file will not validate on the device 110B. This prevents, for example, unauthorized devices being exchanged with devices which have previously been authorized by a security server 140. The data associated with the file m 370 may comprise the byte values of the file.

In certain file systems, one or more file forks may be used for storing metadata 380 with the file. A file fork is a data structure used to store data associated with a file system object. A single file may have multiple forks associated with it and each such fork may be of variable size. In certain cases, file forks may be known as "streams" or "data streams". In the Microsoft™ NTFS file system used in the Windows family of operating systems, each file has a primary data stream and an alternate named data stream (ADS). In the context of the present disclosure, the cryptographic code may be stored in the ADS. This conveniently allows metadata to be stored with the primary data associated to the file and will move with the file if the file is copied from one device to another, for example. Moreover the ADS is invisible to users accessing the file, for example, on a desktop system. Similar file-forking features exist in other file systems. For example, in the Apple™ Mac OS family this feature is called a "resource fork" and may be used to similar effect for storing metadata with data stored in primary fork. A second example of metadata in filesystems exists in the form of "extended file attributes". Extended file attributes are features that enable users to associate files with metadata that is not interpreted by the file system. These can be used for storing cryptographic data such as file-hashes and/or digital certificates. A third example of metadata encountered in commonplace filesystems (which may be used to store the cryptographic code generated by the security server 140) are "inodes" in UNIX-like file systems. The inode is a data structure used to represent a file system object such as file ownership, access mode (read, write, execute permissions), and file type.

The examples described herein have so far been described with reference to one or more operations being performed by the security agent 340 shown in FIG. 3. The security agent is a software application installed in the OS 310, i.e. at the level of the operating system kernel, of the computing device 110A-110C. The security agent 340 is arranged to intercept requests to execute files accessible via the file system 320. However, one or more of the operations of sending a request for the cryptographic code, storing the cryptographic code as metadata 380 against the file m 370, and subsequently re-computing the hash value of the data associated to the file m 370 in response to the interception a request to execute the file may be performed by other entities. The role of the security agent 340 is primarily to intercept the request to execute the file m 370. The other operations may be performed outside of the security agent 340. For example, as described herein, the re-computation of the hash value may be performed by a dedicated cryptographic engine in response to a request from the security agent 340. Moreover, the initial hash computations of files which may be execute on the computing device 110A-110C can all be pre-computed when there is a pre-determined subset of executable files known to the security server 140. In such a case, the cryptographic codes themselves may also be pre-computed. Similarly the operation of storing the cryptographic code in the metadata 380 of the file m 370 need not be performed by the security agent 340. Indeed in one arrangement, generating and storing file hashes of executable files in metadata 380 may be performed independently of the security agent 340.

With regards to the security provided by the security agent 340, in certain implementations, one possible attack may be to disable the security agent 340 in an attempt to prevent re-computation of the hash value for an executable file, or to interrupt the interception of a request to execute a file. One way to thwart this attack will now be described. A portion of the executable file m 370 is signed with a local key which is stored securely using a data protection program interface. The Windows operating system provides one such subsystem in the Windows Data Protection Application Programming Interface (DPAPI). This allows, for example, cryptographic keys to be generated from user login credentials. The local key is salted with a set of bytes contained within the computer program code implementing the security agent 340. In this scenario an attacker would need to obtain execute privileges on the targeted computing device 110A-110C and determine the salt before they could verify the part of the executable file 370 necessary for execution, without also running the security agent 340.

Figure 4:
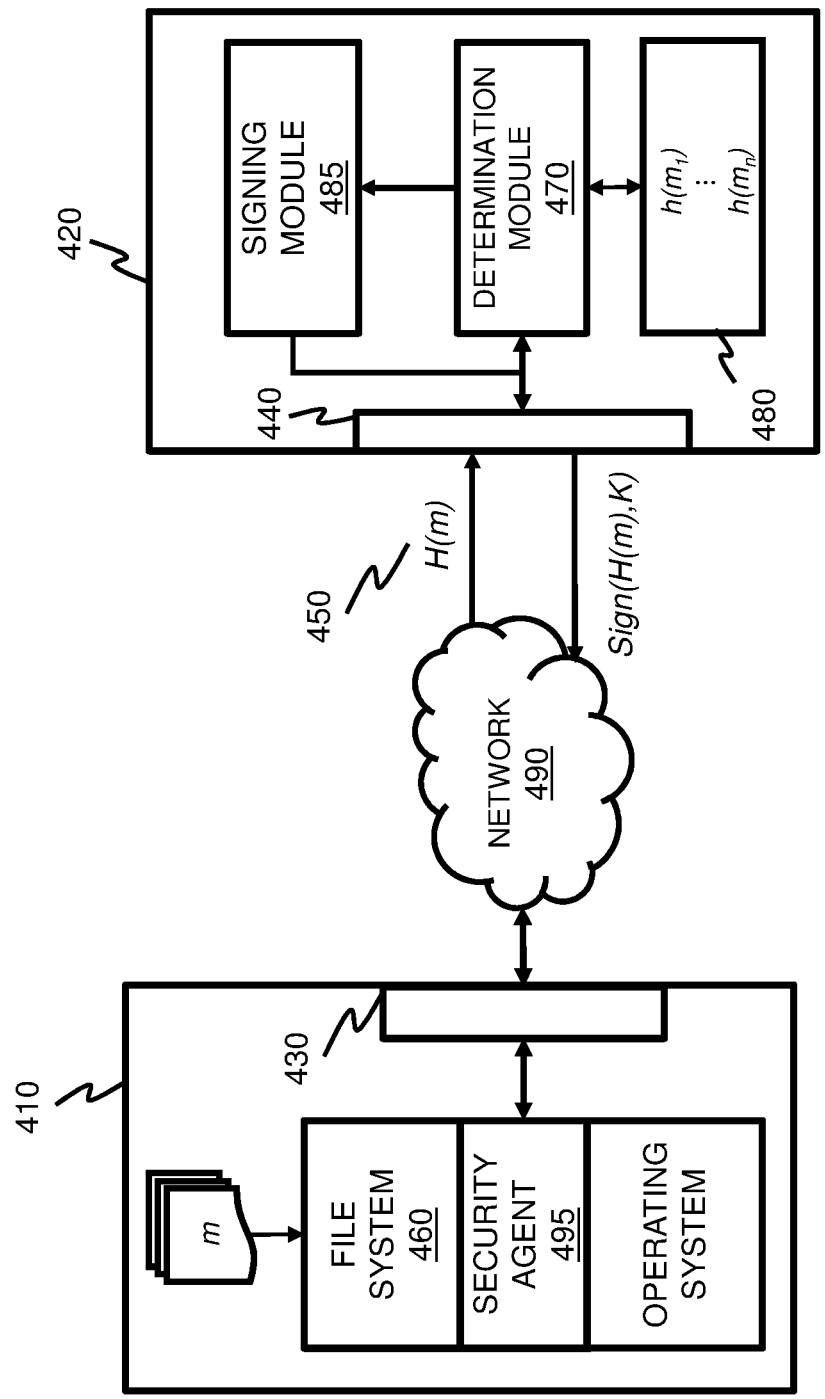
FIG. 4 is a schematic diagram showing a computing device and security server according to an example.

FIG. 4 is a simplified schematic diagram showing an arrangement of software 400 for restricting execution of files stored on a computing device 410 by a security server 420. The computing device 410 is coupled to the security server 420 via a network in a similar way to the security server 140 and computing devices 110A-110B shown in FIG. 1. The computing device 410 can communicate with the security server 420 via a network interface 430. The security server 420 also has a network interface 440. Both the security server 420 and the computing device 410 can send and receive data through their respective network interfaces over the network 495.

The security server 420 is arranged to receive a request from the computing device 410 over the network 495. The request comprises a file hash 450 for a file "m" stored on the computing device 410 accessible through a file system 460. In FIG. 4, the hash value 450 is sent from the computing device 410 to the security server 420, and is a hash value 450 of the data stored in the file "m". As in previous examples described herein, the hash function H can be applied to the data associated to the file and not necessarily just to the file itself. For example, a digital code signing certificate or a portion of the data in the file m.

The security server 420 has a determination module 470 which may be implemented in software as a standalone software module, or a combination of software sub-modules. A determination module 470 is arranged to receive the hash value 450 via the network interface 440. The determination module 470 accesses a collection of stored hash values 480. It uses the hash value 450 as an index to determine if a cryptographic code for the file m is accessible to the security server 420. Each of the hash value(s) $H(m_1), \ldots, H(m_n)$ is a hash value of a file $m_1, \ldots, m_n$ for which a cryptographic code has previously been generated by the security server 420. If it is determined that the cryptographic code is not accessible to the security server 420, then the security server 420 is arranged to compute the cryptographic code. In an alternative embodiment, the hash values stored on the security server 420 are merely indices of executable files known to the security server 420, and the cryptographic codes are generate on-the-fly. This may reduce the amount of data stored on the security server 420.

In FIG. 4, the security server 420 is shown with a signing module 485. The determination module 470 is as arranged to send the hash value of the file m to the signing module 485 if it is determined that the cryptographic code is not accessible via the collection of stored hash values 480. The signing module 485 is arranged to compute the cryptographic code as an output of a cryptographic function of at least the private key of the security server and the received file hash. The signing module 480 is arranged to send the cryptographic code to the network interface 440 of the security server 420. It is then sent to the computing device 410 over the network 490. A security agent 495 is arranged to store the cryptographic code with metadata stored with the computing device. The cryptographic code is used to validate the file hash H(m) on the computing device 410 to allow execution of the file in a manner as previously described in relation to the arrangement 300 and security agent 340 shown in FIG. 3.

According to an example, the security server 420 is arranged to receive a first hash corresponding to a first executable file from a first computing device. At a later time, the security server 420 may receive, from a second computing device, a request comprising a second hash corresponding to a file hash of a second executable file, where the second executable file is a copy of the first executable file. For example, in relation to the network environment shown in FIG. 1, the computing device 110A may be the first computing device and the computing device 110B the second computing device. The computing device 110B can request a cryptographic code for a copy of a first executable file which is stored on the first computing device 110A. The determination module 470 is arranged to recognize that the file hash in the request from the second computing device 110B can be used to locate the cryptographic code computed as a cryptographic function of the file hash for the first executable file. As previously described, the security server 420 sends the cryptographic code to the second computing device 110B, and the code is stored with metadata stored with the second executable file on the second computing device 110B. The cryptographic code is used to validate the file hash for the second executable file on the second computing device 110B to allow execution on that device. Across a large number of network coupled devices, there may be several files that are common to many devices. If the cryptographic code for a common file has been previously generated for another computing device, then it need not be regenerated for a current computing device, the pre-existing code may simply be retrieved and returned.

In FIG. 4, the cryptographic code is shown as a signature Sign(H(m),K) of the file hash H(m) under the private key K of the security server 420. Any suitable signature algorithm may be implemented by the signing module 480. For example, a digital signature algorithm such as the RSA signature algorithm may be implemented. In further examples the cryptographic code comprises a keyed hash message authentication code. One such example of a keyed hash message authentication code is the HMAC algorithm.

According to an example, the security server 420 implements one or more whitelisting and/or blacklisting policies. The determination module 470 can use the file hash received in the request to determine if the file is indicated in whitelisting data comprising a list of allowed files. Here "allowed" means those executable files accessible through the file system 460 on the computing device 410 which are allowed to be executed on that device. The security server 420 is arranged to send the cryptographic code if it is determined that the file hash is on the whitelist.

Alternatively, the security server 420 may implement a blacklisting policy for files accessible to the computing device 410. In this case, if it is determined by the determination module 470 that the file is indicated in blacklist data comprising a list of restricted files then the sending of the cryptographic code is not performed by the security server 420. For example, the security server 420 may receive malicious file definitions from a central server that documents security threats, e.g. a sever coupled to the internet.

Figure 5:
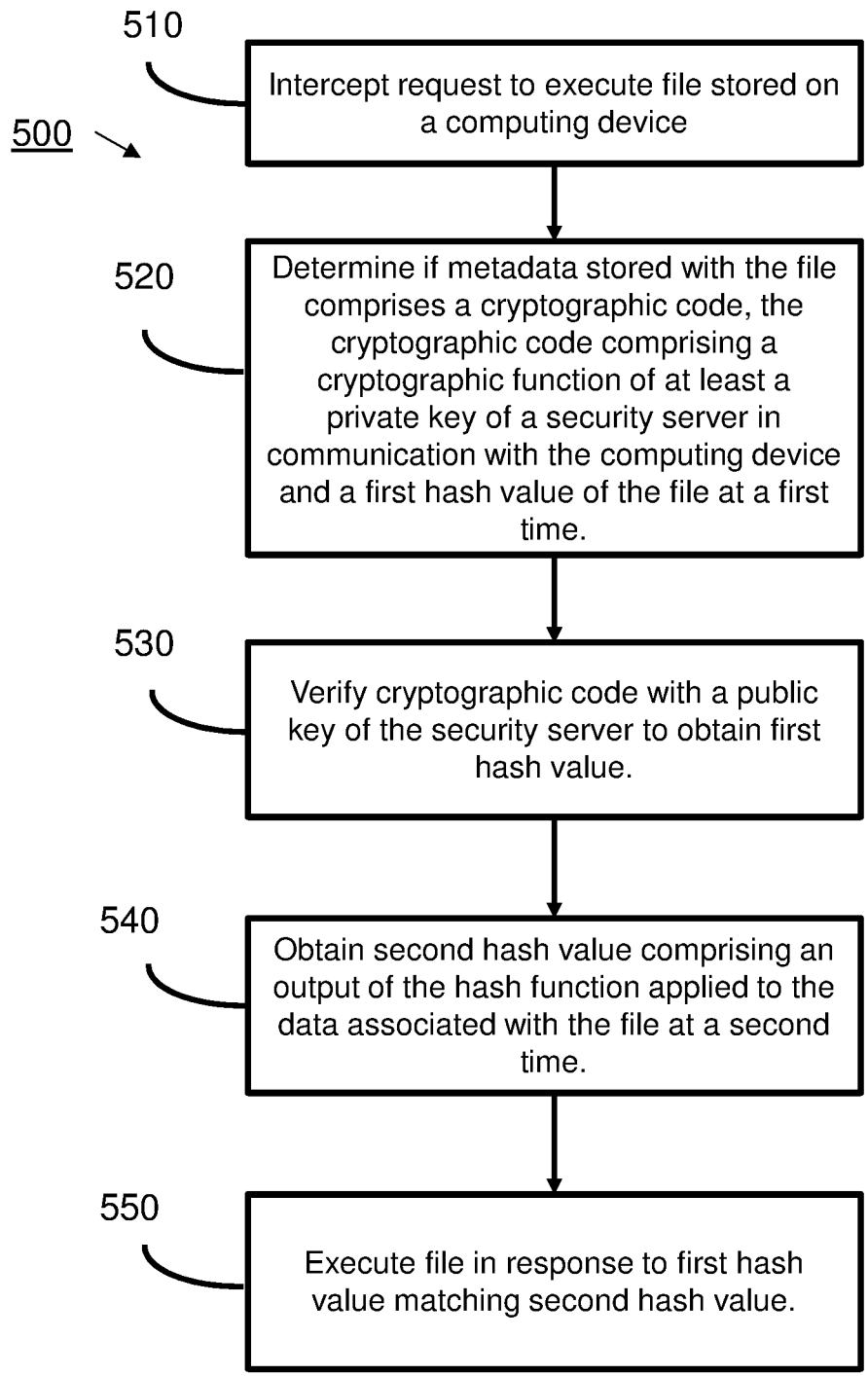
FIG. 5 is a flow diagram showing a method of executing a file on a computing device according to an example.

FIG. 5 is a flow diagram showing a method 500 of restricting execution of files stored on computing device. The method 500 shown in FIG. 5 may be used in conjunction with the network environment and computing devices described herein. The steps 510 to 550 shown in FIG. 5 may be performed by a security agent as described in relation to FIGS. 3 and 4. Step 510 comprises receiving an intercepted request to execute a file stored on a computing device. When the method 500 is used in conjunction with the computing devices and systems shown in FIGS. 3 and 4, the request is intercepted by the security agent. As described above, intercepting a request may comprise registering with an operating system service or driver to be notified of an I/O request before the request is enacted. Step 520 comprises determining if metadata stored within the file to be executed comprises a cryptographic code. The cryptographic code is a function of at least the private key of a security server 140 in communication with the computing device 110A-110C and a first hash value of the file at a first time $t_0$. Step 530 comprises verifying the cryptographic code with the public key of the security server 140 to obtain the first hash value. Step 540 comprises obtaining, a second hash value comprising an output of the hash function applied to the data associated with the file at a second time. Step 550 comprises executing the file in response to the first hash value matching the second hash value. If the first hash value does not match the second hash value, or if the metadata does not comprise the cryptographic code, execution of the file may be prevented. In this case, an error or other indication may be returned to the user.

Figure 6:
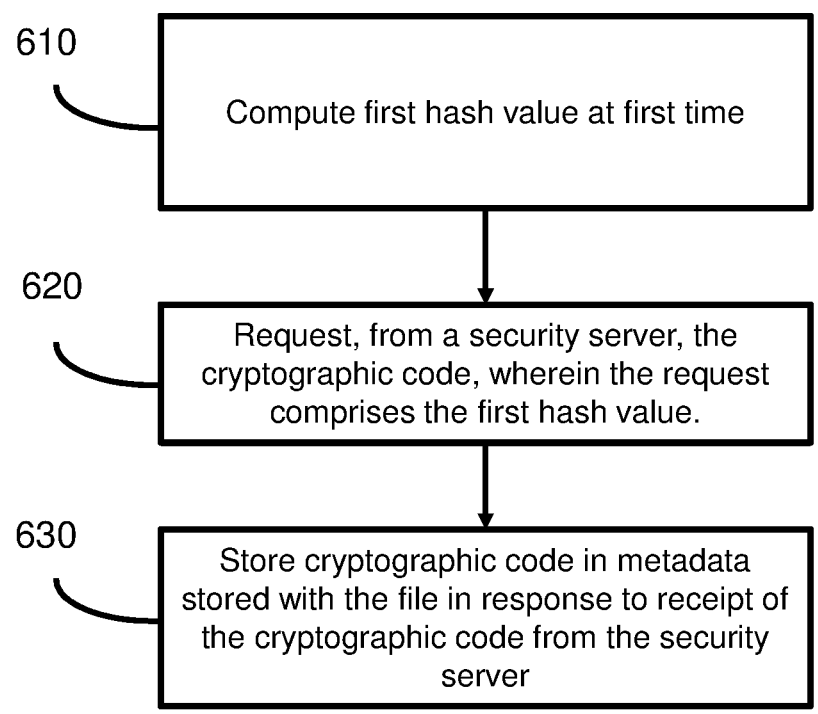
FIG. 6 is a flow diagram showing a method of storing a cryptographic code according to an example.

FIG. 6 is a flow diagram showing a method 600 of storing a cryptographic code in metadata of a file according to an example. The method 600 shown in FIG. 6 may be performed between a computing device 110A-110C and security server 140 such as those described in FIGS. 1 to 4. Step 610 comprises computing a hash value of a file at a first time. The hash value may be computed at any time, for example, a hash value may be determined in response to a scan of a file system accessible to the computing device 110A-110C performing the method as described above with reference to FIG. 6. Step 620 comprises sending a request comprising the first hash value, to the security server 140. The request is for a cryptographic code as described herein. At step 630 the cryptographic code obtained from the security server 140 is stored with the file within metadata associated with the file. A cryptographic code may be provided by the security server 140 if the file is on a whitelist of allowed applications that is accessible to the security server 140. If the file is not on the whitelist, and/or is on an accessible blacklist, no cryptographic code is provided and stored. In one case, an error or warning message may be stored in place of the cryptographic code. This error or warning message may be parsed by the security agent 340; for example, the security agent 340 may be configured to warn the user or disable the file.

Figure 7:
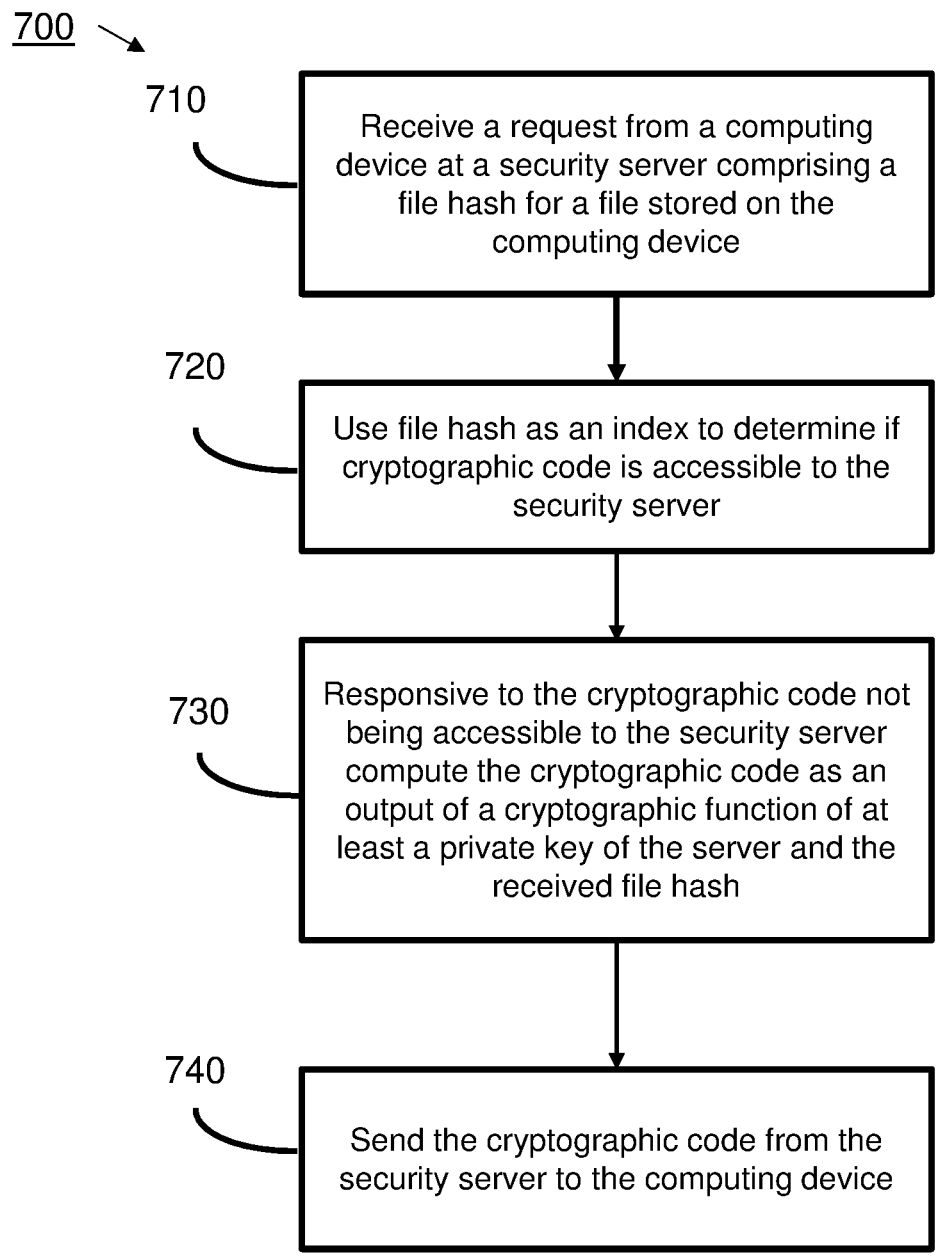
FIG. 7 is a flow diagram showing a method of generating and sending a cryptographic code according to an example.

FIG. 7 is a flow diagram showing a method 700 of determining the availability of a cryptographic code according to an example. The method 700 shown in FIG. 7 may be performed by a security server 140 in conjunction with a computing devices 110A-110C as described herein. Step 710 comprises receiving a request from the computing device 110A-110C at the security server 140, wherein the request comprises a file hash of a file stored on the computing device 110A-110C. According to an example, the file hash is an output of a hash function applied to data associated with the file at a first time. Step 720 comprises using the file hash as an index to determine if cryptographic code for the file is accessible to the security server 140. For example, the security server 140 can access a list of pairs comprising an index and a cryptographic code, where the index comprises the file hash of the file. Step 730 comprises determining if the cryptographic code is not accessible to the security server. If the cryptographic code is not accessible, the cryptographic code for the file corresponding to the received file hash is computed as an output of a cryptographic function of at least the private key of the server 140 and the received file hash. Step 730 may be performed conditionally, e.g. if the file hash matches a file hash of a whitelisted file and/or does not match a file hash of a blacklisted file. Step 740 comprises sending the cryptographic code from the security server 140 to the computing device 110A-110C.

Figure 8:
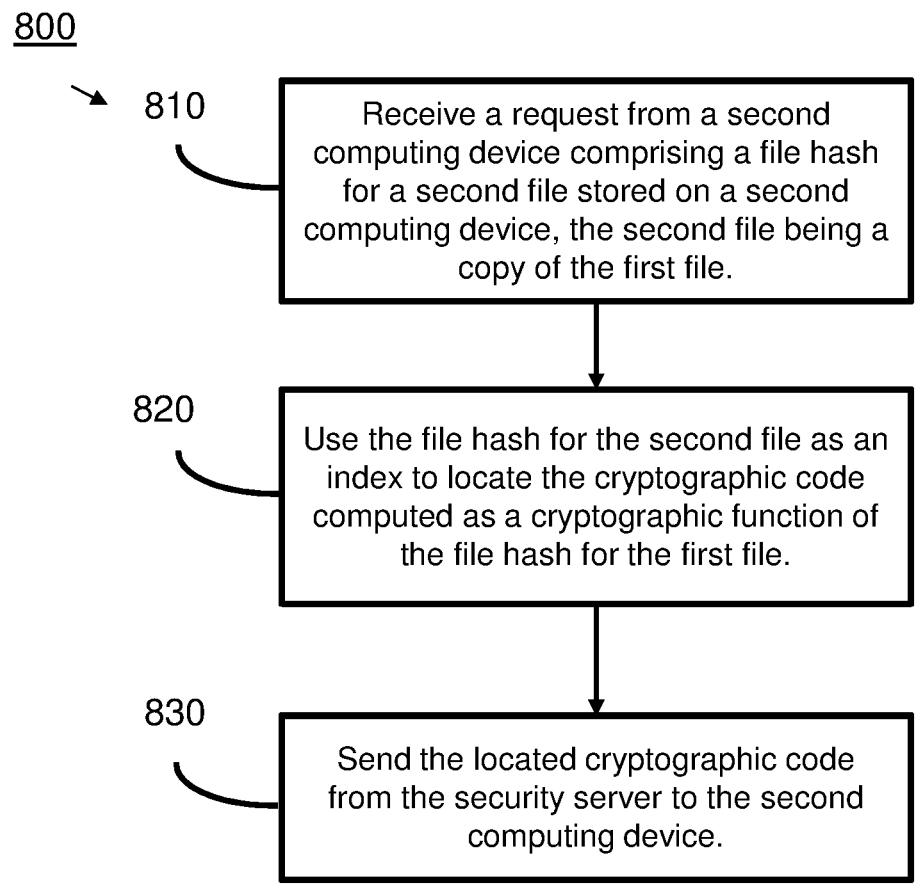
FIG. 8 is a flow diagram showing a method of sending a cryptographic code according to an example.

FIG. 8 is a flow diagram showing a method 800 according to example. The method 800 may be used in conjunction with the methods and systems described herein. In particular, with reference to the network environment described in FIG. 1, the method 800 may be used where two or more computing devices 110A, 110B are connected to a network entity 130 over a network 120 to reduce the amount of computation by a security server 140. Step 810 comprises receiving a request from a second computing device 110B. The request comprises a file hash of a second file from the second computing device 110B, where the second file is a copy of a first file on a first computing device for which there already exists a cryptographic code. Step 820 comprises using the file hash from the second file as an index to locate the cryptographic code computed as a cryptographic function of the file hash for the first file on the first computing device 110A. Step 830 comprises sending the located cryptographic code from the security server to the second computing device.

Figure 9:
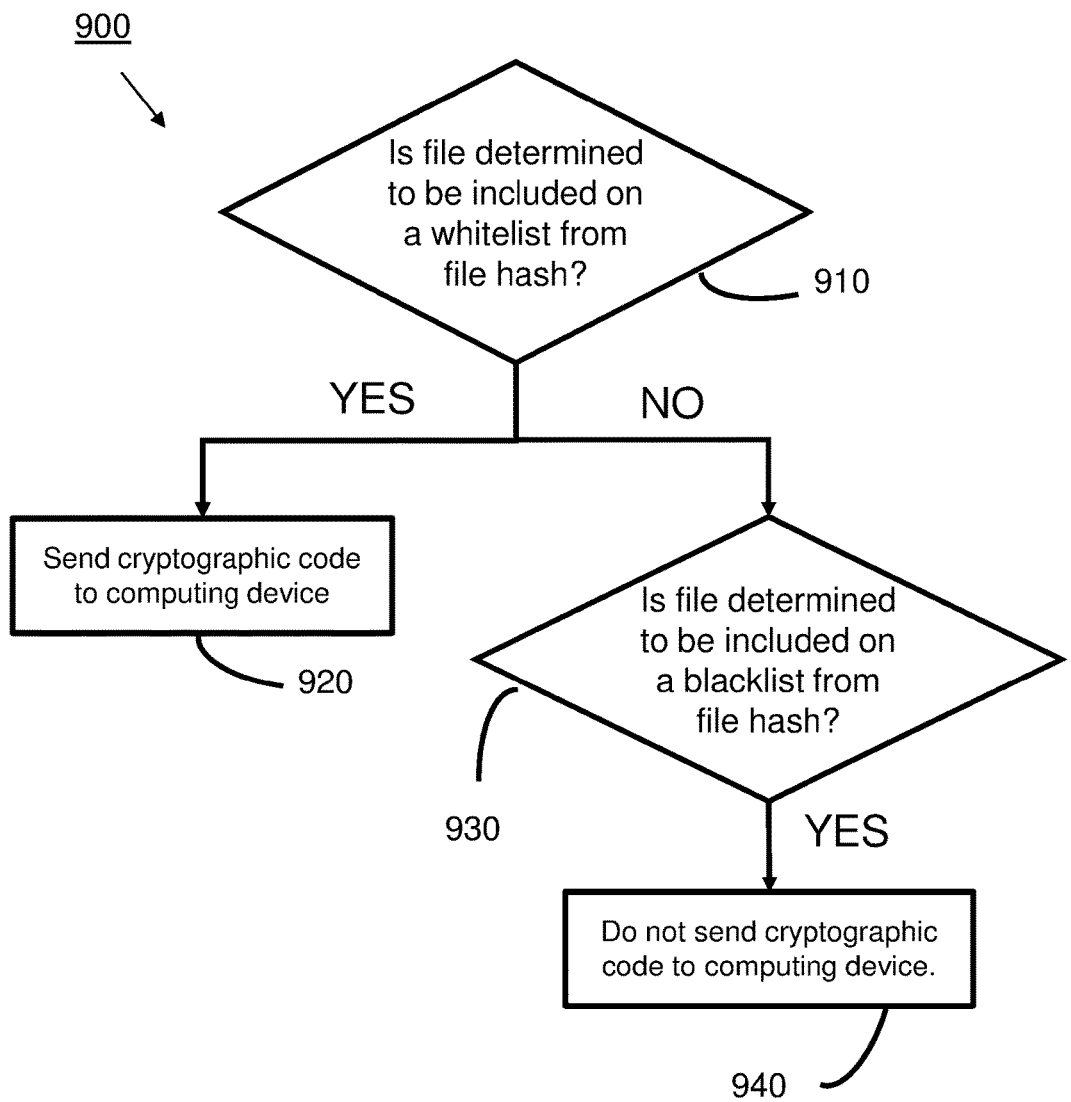
FIG. 9 is a flow diagram showing a method of checking a file hash against whitelist data and blacklist data according to an example.

FIG. 9 is a flow diagram showing a method 900 of determining if a file is whitelisted or blacklisted according to an example. The method 900 may be used in conjunction with the security server described herein. Step 910 comprises determining if the file is included on a whitelist from a file hash. According to one method, the file hash is used as an index to determine if the file is indicated in whitelist data comprising a list of allowed files. If it is determined that the file is included on the whitelist then at step 920 a cryptographic code is sent to the computing device 110A-110C that sent a request. Otherwise it is determined the file is not included on the whitelist. Step 930 comprises determining if the file is included on a blacklist. According to one method, the file hash is used as an index to determine if the file is indicated in blacklist data comprising a list of disallowed files. Step 940 comprises not sending the cryptographic code corresponding to that file, if it is determined that the file is included on the blacklist. According to an example, one or both of the whitelisting and blacklisting methods described herein may be used in conjunction with the computing devices 110A-110C and security server 140 described previously. In particular, the security server 140 can access either one or both of whitelist data and blacklist data prior to sending a cryptographic code to the computing device 110A-110C.

Certain examples described herein provide systems and methods of using a computing device in a networked environment. In particular, the systems described herein provide a means of securely executing files on a computing device. The systems described herein may also provide a cryptographically secure integrity check for files accessible via a file system on the computing device. Moreover the system can restrict those files which are executable on the device via the use of whitelisting at the security server.

Certain examples described herein provide advantages over comparative systems. The systems and methods disclosed herein provide a means of securely managing executable files on devices in a networked environment when devices are both connected and disconnected from the network. The systems and methods disclosed herein do not require the devices to have specialized cryptographic hardware beyond, in certain cases, secure key storage. In particular, the cryptographic code stored in the metadata of an executable file moves with the file instead of being stored separately on the computing device. The whitelisting data in the form of hash values of executable files does not need to be stored separately on the device—the computing device simply re-computes the hash value at the time of execution and checks the value against the value stored in the metadata of the file. Comparative systems with cryptographic security such as TPM technology have a list of "integrity values" stored on the computing device in the TPM which grow with the size of the whitelisting data. Hence the present invention provides a more efficient solution to the problem of securely managing executable files.

Figure 10:
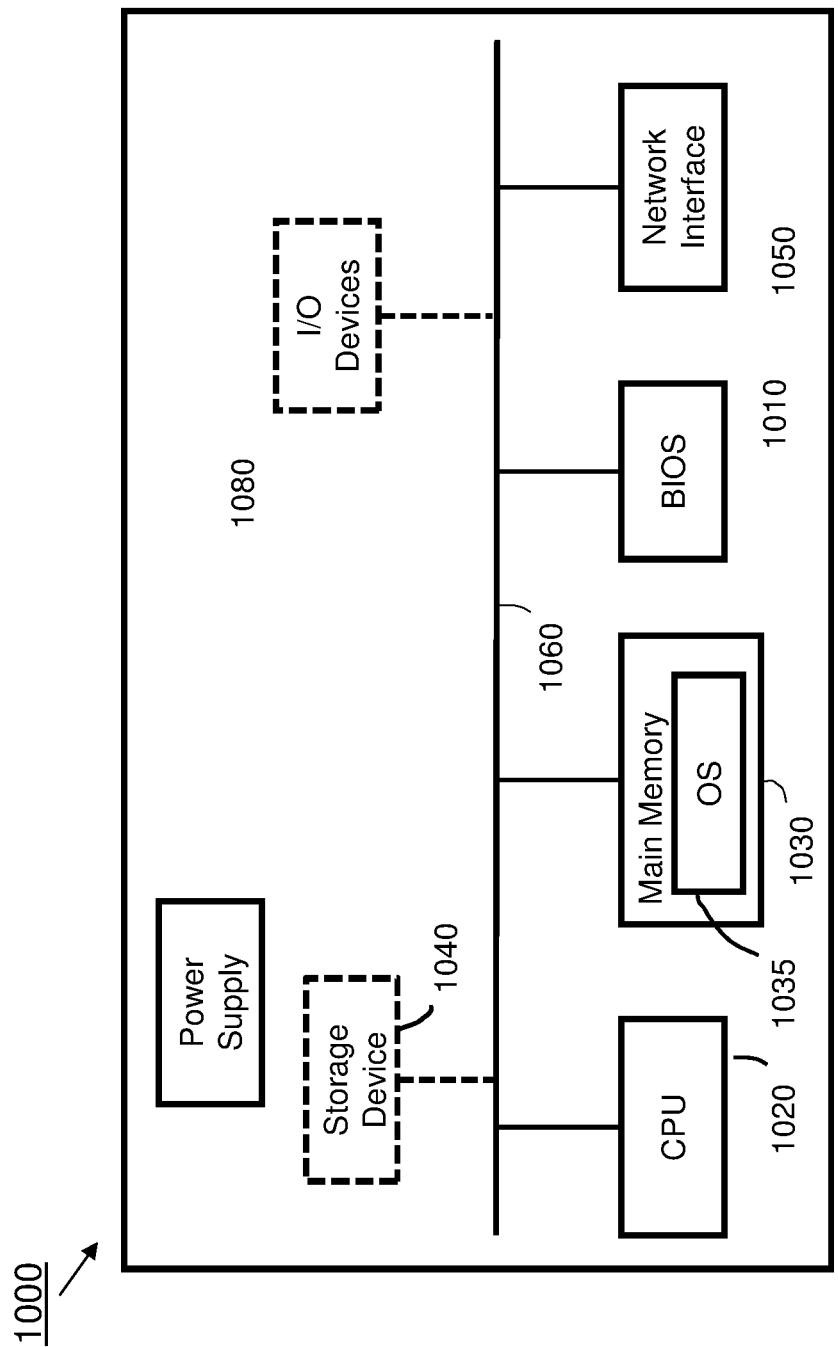
FIG. 10 is a schematic diagram of a computing device according to an example.

FIG. 10 is a simplified schematic diagram showing a computing device 1000 according to an example. The computing devices 110A-110C shown in FIG. 1 are the same or similar to the computing device 1000 in FIG. 10. The servers 140A and 140B shown in FIG. 1 may also comprise components similar to those shown in FIG. 10 in computing device 1000. The computing device 1000 comprises, amongst other components: a Read Only Memory (ROM) 1010 storing a basic input/output system (BIOS); a central processing unit (CPU) 1020 having a Random Access Memory (RAM) that implements a main memory 1030; a hard disk drive or other storage device 1040, for example electronic memory; and a network interface 1050.

These components may be coupled to one or more systems buses 1060 and powered by a power supply 1070. The computer device 1000 may also comprise a display driver coupled to a display device (not shown) and one or more human interface devices or input devices represented by the I/O devices 1080; however, these components may be absent on a typical server computer such as the server 140 shown in FIG. 1. The network interface 1040 couples the computing device 1000 to a network such as network 120 shown in FIG. 1. In use, software applications may be stored in the storage device 1040 before being loaded into main memory 1030 and executed by the CPU 1020. For example, the computer of FIG. 10 shows an operating system 1035 in the main memory, which may be, amongst others, a Linux/UNIX or Windows based operating system.

Although FIG. 10 shows a computer device, the examples described herein may be used with a variety of network devices, including but not limited to, smartphones, tablets, network-coupled sensors, gateways, routers, switches, bridges, hubs, repeaters, proxy servers, border controllers, file servers, network-coupled storage devices, firewall devices etc.

The term "software" or "application" or "executable file" as used herein refers to any tool, function or program that is implemented by way of computer program code. In use, an executable form of the computer program code is loaded into memory (e.g. RAM) and is processed by one or more processors. As such the term "software" includes, without limitation: an operating system; application programs; patches for, and updates of, software already installed on the network; and new software packages.

As used herein, Windows® and Microsoft® are registered trademarks of Microsoft Corporation, Linux® is the registered trademark of Linus Torvalds in the U.S. and other countries, and UNIX® is a registered trademark of The Open Group. The registered trademark symbol ® has been omitted for clarity but is implied. Other registered trademarks are identified by the symbol ® in situ.

The above examples are to be understood as illustrative. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

What is claimed is:

1. A method of restricting execution of files stored on a computing device, the method comprising:
    intercepting a request to execute a file stored on the computing device;
    determining if metadata stored with the file comprises a cryptographic code, the cryptographic code comprising a cryptographic function of at least a private key of a security server in communication with the computing device and a first hash value, the first hash value being an output of a hash function applied to data associated with the file at a first time;
    responsive to said metadata comprising the cryptographic code,
        verifying said code with a public key of the security server to obtain the first hash value;
        obtain a second hash value comprising an output of the hash function applied to the data associated with the file at a second time; and
        executing the file in response to the first hash value matching the second hash value.

2. The method of claim 1, wherein the data associated with the file comprises a sequence of bytes from the file and the method comprises:
    computing the first hash value at the first time;
    requesting, from the security server, the cryptographic code, wherein the request comprises the first hash value; and
    following receipt of the cryptographic code from the security server, storing said code in the metadata stored with the file.

3. The method of claim 1, comprising:
    responsive to said metadata not comprising the cryptographic code or the first hash value not matching the second hash value, preventing execution of the file.

4. The method of claim 2, wherein the computing, requesting and storing operations are performed responsive to said metadata not comprising the cryptographic code.

5. The method of claim 4, comprising:
    preventing execution of the file in response to the security server not being accessible.

6. The method of claim 2, wherein the computing, requesting and storing operations are performed prior to intercepting the request and following location of the file in a scan of a file system accessible to the computing device.

7. The method of claim 1, wherein the data associated with the file comprises a code signing certificate that is used to digitally sign the file.

8. The method of claim 1, wherein the cryptographic code comprises a cryptographic function of the private key of the security server, the first hash value and a hardware identifier of the computing device.

9. The method of claim 1, wherein the metadata stored with the file comprises a system file fork.

10. The method of claim 9, wherein the system file fork comprises an alternate data stream for the file or a resource fork for the file.

11. The method of claim 1, wherein the metadata stored with the file comprises extended attributes of the file.

12. The method of claim 1, wherein the method is performed by a security agent installed on the computing device.

13. The method of claim 12, wherein at least a portion of the file is signed using a local key, the local key being salted with a sample of bytes contained within computer program code implementing the security agent.

14. The method of claim 13, wherein the local key is secured using a data protection application programming interface.

15. The method of claim 13, wherein the computer program code implementing the security agent is cryptographically signed.

16. A method of restricting execution of files stored on a computing device, the computing device being coupled to a security server via a network, the method comprising:
    receiving, at the security server, a request from the computing device over the network, the request comprising a file hash for a file stored on the computing device;
    using, at the security server, the file hash as an index to determine if a cryptographic code for the file is accessible to the security server;
    responsive to the cryptographic code not being accessible to the security server, computing, at the security server, the cryptographic code as an output of a cryptographic function of at least a private key of the security server and the received file hash; and
    sending the cryptographic code from the security server to the computing device,
    wherein the cryptographic code is stored with metadata stored with the file on the computing device and is used to validate the file hash on the computing device to allow execution of the file.

17. The method of claim 16, wherein the request is received from a first computing device in relation to a file hash for a first file and the method comprises:
    receiving, at the security server, a request from a second computing device over the network, the request comprising a file hash for a second file stored on the second computing device, the second file comprising a copy of the first file;
    using, at the security server, the file hash for the second file as an index to locate the cryptographic code computed as a cryptographic function of the file hash for the first file; and
    sending the located cryptographic code from the security server to the computing device,
    wherein the cryptographic code is stored with metadata stored with the second file on the second computing device and is used to validate the file hash for the second file on the second computing device to allow execution of the second file on the second computing device.

18. The method of claim 16, comprising:
    using the file hash to determine if the file is indicated in whitelist data comprising a list of allowed files,
    wherein the sending of the cryptographic code is performed responsive to the file being indicated in the whitelist data.

19. The method of claim 16, comprising:
using the file hash to determine if the file is indicated in blacklist data comprising a list of restricted files, wherein the sending of the cryptographic code is not performed responsive to the file being indicated in the blacklist data.

20. A security agent installed on a computing device and configured to perform the method of claim 1, the computing device comprising:
at least one memory including computer program code; and
at least one processor in data communication with the at least one memory, wherein the at least one processor is configured to cause the security agent to perform a method for restricting execution of files stored on a computing device, the method comprising:
intercepting a request to execute a file stored on the computing device;
determining if metadata stored with the file comprises a cryptographic code, the cryptographic code comprising a cryptographic function of at least a private key of a security server in communication with the computing device and a first hash value, the first hash value being an output of a hash function applied to data associated with the file at a first time;
responsive to said metadata comprising the cryptographic code,
verifying said code with a public key of the security server to obtain the first hash value;
obtain a second hash value comprising an output of the hash function applied to the data associated with the file at a second time; and
executing the file in response to the first hash value matching the second hash value.

* * * * *